(12) United States Patent
Gillet

(10) Patent No.: US 7,159,064 B2
(45) Date of Patent: Jan. 2, 2007

(54) METHOD AND DEVICE FOR INCREASING DATA TRANSFER IN MULTI-MEDIA CARD

(75) Inventor: Michel Gillet, Helsinki (FI)

(73) Assignee: Nokia Corporation, Espoo (FI)

( * ) Notice: Subject to any disclaimer, the term of this patent is extended or adjusted under 35 U.S.C. 154(b) by 123 days.

(21) Appl. No.: 10/733,844

(22) Filed: Dec. 11, 2003

(65) Prior Publication Data

US 2005/0132116 A1    Jun. 16, 2005

(51) Int. Cl.
*G06F 13/00* (2006.01)

(52) U.S. Cl. .................. 710/307; 710/301; 710/316; 710/315; 711/115; 235/492

(58) Field of Classification Search ........ 710/300–307, 710/311–317, 62–65, 72–74, 36–38, 29–32, 710/2–5; 361/686; 365/185.28, 185, 28; 711/115; 235/492
See application file for complete search history.

(56) References Cited

U.S. PATENT DOCUMENTS

| | | | |
|---|---|---|---|
| 6,824,063 B1 * | 11/2004 | Wallace et al. ............ | 235/487 |
| 6,896,523 B1 * | 5/2005 | Nishizawa et al. .......... | 439/60 |
| 2001/0009505 A1 * | 7/2001 | Nishizawa et al. ......... | 361/737 |
| 2003/0056050 A1 * | 3/2003 | Moro ........................ | 710/301 |
| 2004/0070952 A1 * | 4/2004 | Higuchi et al. ............ | 361/737 |
| 2004/0156242 A1 * | 8/2004 | Iida et al. ............... | 365/185.28 |
| 2005/0182881 A1 * | 8/2005 | Chou et al. ................ | 710/301 |

FOREIGN PATENT DOCUMENTS

| | | | |
|---|---|---|---|
| EP | 0409241 A1 * | 7/1990 | |
| EP | 1271328 A1 * | 1/2003 | |
| WO | WO 0054140 | * 9/2000 | |

OTHER PUBLICATIONS

SD Group, SD Memory Card Specifications, Apr. 15, 2001, Sandisk Corporation.*
MMCA Technical Committee; "The MultiMediaCard, System Specification"; Version 4.0. Draft 3; Apr. 2003.

* cited by examiner

*Primary Examiner*—Mark H. Rinehart
*Assistant Examiner*—Raymond N Phan
(74) *Attorney, Agent, or Firm*—Ware, Fressola, Van Der Sluys & Adolphson LLP

(57) ABSTRACT

An electronic device having a MultiMediaCard host connected to a MultiMediaCard card via a bus system having a plurality of signal lines and a plurality of data lines, wherein the host is operable in a number of data modes. At least in one of the data modes the number of data lines used to convey data between the host and card is smaller than the number of data lines available on the bus system, leaving some unused data lines. An embedded module in the card is used to generate a clock signal, a command signal and further data to be conveyed between the host and the card on some or all of the unused data lines. When the electronic device is operable in an SPI mode, the CS line can be used for sending a command signal from the card to the host.

35 Claims, 7 Drawing Sheets

METHOD AND DEVICE FOR INCREASING DATA TRANSFER IN MULTI-MEDIA CARD

FIELD OF THE INVENTION

The present invention relates generally to MultiMediaCard (MMC) technology and, more particularly, to MMC interface based on MMC Specification 4.0.

BACKGROUND OF THE INVENTION

The MultiMediaCard (MMC) is a universal low cost data storage and communication medium. It is designed to cover a wide area of applications such as electronic toys, electronic organizers, personal digital assistants, digital cameras, smart phones, digital recorders, MP3 players, pagers. Its targeted features include high mobility and high performance at a low cost. High performance can be expressed in terms of low power consumption and high data throughput at the memory card interface.

To provide for the forecasted migration of CMOS power ($V_{DD}$) requirements and for compatibility and integrity of the MMC systems, two types of MMCs are currently defined. One is referred to as High Voltage MMC with a $V_{DD}$ range of 2.7–3.6 V, and the other is referred to as Low Voltage MMC with a $V_{DD}$ range of 1.65–1.95 V and 2.7–3.6 V.

According to the MMC Specification 4.0 (Draft 3), the MMC communication is based on a 13-pin bus operating in a low voltage range. The communication protocol for use with the MMCs is referred to as MultiMediaCard protocol.

The MMC transfers data via a configurable number of data bus signals. The communication signals are:

CLK—with each cycle of this signal, a one-bit transfer on the command and each of the data lines is performed. The frequency may vary between zero and the maximum clock frequency of 20 MHz, 26 MHz or 52 MHz.

CMD—a bidirectional command channel used for card initialization and transfer of commands. This signal has two operation modes: open-drain for initialization mode, and push-pull for fast command transfer. Commands are sent from the MMC bus master to the card, and responses are sent from the card to the host.

DAT0–DAT7—bidirectional data channels. The DAT signals operate in a push-pull mode. Either the card or the host is driving these signals at a time. By default, after power up or reset, only DAT0 is used for data transfer. A wide data bus can be configured for data transfer using DAT1–DAT7 by the MMC controller.

The card is connected directly to the signals of the MMC bus. The card contacts as defined in TABLE I.

TABLE I

| Pin No. | Name | Type | Description |
|---|---|---|---|
| 1 | DAT3 | I/O/PP | Data |
| 2 | CMD | I/O/PP/OD | Command/Response |
| 3 | $V_{SS1}$ | S | Supply voltage ground |
| 4 | $V_{DD}$ | S | Supply voltage |
| 5 | CLK | I | Clock |
| 6 | $V_{SS2}$ | S | Supply voltage ground |
| 7 | DAT0 | I/O/PP | Data |
| 8 | DAT1 | I/O/PP | Data |
| 9 | DAT2 | I/O/PP | Data |
| 10 | DAT4 | I/O/PP | Data |
| 11 | DAT5 | I/O/PP | Data |
| 12 | DAT6 | I/O/PP | Data |
| 13 | DAT7 | I/O/PP | Data |

Note:
TYPE:
S = power supply;
I = input;
O = output;
PP = push-pull;
OD = open-drain
DAT0–DAT7 lines for read-only cards are outputs only.

The main design goal of the MultiMediaCard system is to provide a very low cost mass storage product implemented as a 'card' with a simple controlling unit, and a compact, easy-to-implement interface. It is based on modularity and the capability of reusing hardware over a large variety of cards. In general, there are four typical architectures of possible MMC systems: 1) software protocol emulation, wherein an MMC card is linked to a device (e.g. an LCD) by a micro-controller; 2) point-to-point liked system, wherein the MMC card is linked to a device by an MMC adapter and a device processor (e.g, an audio processor to drive a speaker), 3) single bus linked system, and 4) PC bus linked system. In most cases, an MMC card is used in conjunction with a host, as shown in FIG. 1. As shown in FIG. 1, the MMC host typically has an MMC adapter to receive the MMC bus of an MMC card. Depending on the application in the MMC host, the host has an application adapter, which is linked to the MMC adapter by an MMC adapter interface. The MMC adapter and the application adapter are part of a component generally referred to as the MMC controller. The application adapter has specific software to perform application-oriented tasks. The host can be a mobile phone, a camera, a PDA or the like. In a host such as a mobile phone, the application can be a navigation system. In a more complex MMC system, a DMA (Direct Memory Access) controller/bus bridge is also used in a hardware system.

The MultiMediaCard bus is designed to connect either solid-state mass-storage memory or I/O devices in a card format to multimedia applications. The bus implementation allows the coverage of application fields from low-cost systems to systems with a fast data transfer rate. It is a single master bus with a single slave or a plurality of slaves. The MultiMediaCard bus master is the bus controller. As shown in FIG. 2, the slave is either a single mass storage card or an I/O-card with an on-card controlling unit to perform the data transfer. The mass-storage card can be made with possibly different technologies such as ROM (Read-Only Memory), OTP (One Time Programmable), MTP (Multiple Time Programmable) and Flash (multiple-time programmable non-volatile memory). The MultiMediaCard bus also includes power connections to supply power to the card.

MultiMediaCard Bus Protocol

After a power-on reset, the host must initialize the card by a special message-based MultiMediaCard protocol. Each message is represented by one of the following tokens:

1. command: a command is a token which starts an operation. A command is sent from the host to a card and is transferred serially on the CMD line.

2. response: a response is a token which is sent from the card to the host as an answer to a previously received command. A response is transferred serially on the CMD line.
3. data: data can be transferred from the card to the host, or vice versa, via the data lines. The number of data lines used for the data transfer can be 1(DAT0), 4(DAT0–DAT3), or 8(DAT0–DAT7).

It should be noted that, in the older versions of the MMC specification (Version 3.31, for example), there is only one bi-directional data channel, DAT, as compared to 8 bi-directional data channels as defined in MMC Specification 4.0. With 8 bi-directional data channels, bus width can be selected among 1-bit, 4-bit and 8-bit modes for data transmission. The 1-bit mode is mainly used for backward compatibility. The other two modes are used for MMCs according to Specification 4.0 and higher. The 4-bit data bus gives a bandwidth of 8 times as compared to the 1-bit data bus because the clock frequency is doubled. The 8-bit data bus gives a bandwidth of 16 times. With the 4-bit mode, the data bus is not fully utilized.

An MMC card can also be used in an SPI (Serial Peripheral Interface) mode. The SPI mode consists of a secondary, optional communication protocol based on the SPI standard. This communication protocol is offered by Flash-based MultiMediaCards. This mode is a subset of the MultiMediaCard protocol, designed to communicate with an SPI channel, found in some micro-controllers. The interface is selected during the first reset command after power up (CMD0) and cannot be changed once the part is powered on.

The SPI standard defines the physical link only, and not the complete data transfer protocol. The MultiMediaCard SPI implementation uses a subset of the MultiMediaCard protocol and command set. The Serial Peripheral Interface is a general purpose synchronous serial interface. The MultiMediaCard SPI channel consists of the following signals:

CS—Host to card Chip Select Signal
CLK—Host to card clock signal
DataIn—Host to card data signal
DataOut—Card to host data signal The MultiMediaCard SPI bus system is shown in FIG. 3. The MultiMediaCard pin assignment in SPI mode is shown in TABLE II.

TABLE II

| Pin No. | Name | Type | Description |
| --- | --- | --- | --- |
| 1 | CS | I | Chip Select (neg true) |
| 2 | DI | I/PP | Data In |
| 3 | $V_{SS}$ | S | Supply voltage ground |
| 4 | $V_{DD}$ | S | Supply voltage |
| 5 | SCLK | I | Clock |
| 6 | $V_{SS2}$ | S | Supply voltage ground |
| 7 | DO | O/PP | Data Out |
| 8 | | | Not used |
| 9 | | | Not used |
| 10 | | | Not used |
| 11 | | | Not used |
| 12 | | | Not used |
| 13 | | | Not used |

In MMC mode, the CS signal line is not used.

thus, when there are unused data lines and a possible CS signal line between an MMC host and a memory device in one or more operational modes, it is advantageous and desirable to provide a method for using these unused lines in order to improve the performance of the MMC host.

SUMMARY OF THE INVENTION

With 8 bi-directional data channels in an MMC card, not all the data channels are used in the 4-bit bus width. The present invention makes use of the unused data channels for implementing new modes of operation. In one new mode of operation, according to the present invention, the MMC card is used as a Smart MMC card in that the MMC card has a master role. A Smart MMC card functions as more than just a memory embedded therein. As such, the MMC card can embed a variety of smart devices such as micro-controllers, complex I/O cards. These devices have a very efficient way to interrupt the terminal, a good DMA-like capability, and a high bandwidth of 200 Mbits.

Thus, according to the first aspect of the present invention, there is provided a method for enhancing performance of an electronic device having a host module operatively connected to a memory device via a bus system, the bus system comprising a plurality of signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system. The method comprises:

providing in the memory device a module for generating at least one further signal; and causing an exchange of data, based on said at least one further signal, between the host module and the memory device using at least one of the unused data lines even when the host module is operated in said at least one data mode.

The at least one further signal comprises a command signal and a clock signal, conveyed to the host module on another one of the unused data lines.

When N is equal to 8 and M is equal to 4, leaving 4 unused data lines, said at least one further signal comprises a clock signal conveyed from the memory device to the host module on another one of the unused data lines, and a command signal conveyed between the host module and the memory device on yet another one of the unused data lines. The at least one of the unused data lines comprises two unused data lines so as to allow the exchange of data to be carried out in a differential manner.

When the electronic device is operable in a serial peripheral interface (SPI) mode and the bus system further comprises a further signal line for conveying a chip select (CS) signal from the host module to the memory device, the further signal is conveyed from the memory device to the host module on the further signal line. The further signal comprises a command signal.

When N is equal to 8 and M is equal to 4, leaving 4 unused data lines for carrying out the exchange of data, the exchange of data can be carried out in two differential pairs.

When N is equal to 8 and M is equal to 1, leaving 7 unused data lines, said at least one further signal comprises a clock signal conveyed from the memory device to the host module on another one of the unused data lines, and a command signal conveyed between the host module and the memory device on yet another one of the unused data lines. The exchange of data is carried out on a different one of the unused data lines.

According to the second aspect of the present invention, there is provided an electronic device for use in conjunction with a memory device. The electronic device comprises:

a host module; and a bus system operatively connecting the hose module to the memory device, the bus system comprising a plurality of signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system, and wherein the memory device is capable of generating at least one further signal, for causing an exchange of data, based on the further signal, between the host module and the memory device using at least one of the unused data lines even when the host module is operated in said at least one data mode.

The memory device comprises an embedded module for generating said at least one further signal.

The at least one further signal comprises a command signal and a clock signal conveyed between the host module on another one of the unused data lines.

When the electronic device is operable in a serial peripheral interface, the bus system further comprises a further signal line for conveying a chip select (CS) signal from the host module to the memory device, and the further signal is conveyed from the memory device to the host module on the further signal line. The further signal comprises a command signal.

The electronic device comprises a software program, responsive to said at least one further signal, for processing the data exchanged between the host module and the memory device on at least one of the unused data lines.

The electronic device can be a mobile phone, a PDA, a camera, a digital recorder, an electronic toy, an electronic organizer, an MP3 player, a pager or the like.

According to the third aspect of the present invention, there is provided a memory device for use in conjunction with a host module via a bus system, the bus system comprising a plurality of signal lines and N data lines for conveying signals and data between the host module and the memory device, wherein the host module is operable in a plurality of data modes, said plurality of data modes include at least one data mode that uses M data lines to convey data between the host module and the memory device, with M smaller than N, leaving (N−M) unused data lines in the bus system. The memory module comprises:

a module for generating at least one further signal; and a sub-bus system operatively connecting the module and at least some of the unused data lines for causing an exchange of data, based on the further signal, between the host module and the memory device using said at least some of the unused data lines even when the host module is operated in said at least one data mode. The at least one further signal comprises a clock signal and a command signal conveyed between the host module and the memory device on another one of the unused data lines.

The module for generating said at least one further signal can be a micro-controller, an I/O device or the like.

According to the fourth aspect of the present invention, a software program product embodied in a memory device, the memory device for use in conjunction with a host module via a bus system, the bus system comprising a plurality of signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system, the software program comprises:

a code for generating at least one further signal; and a code for causing an exchange of data, based on the further signal, between the host module and the memory device using said at least some of the unused data lines even when the host module is operated in said at least one data mode. The at least one further signal comprises a command signal and a clock signal.

According to the fifth aspect of the present invention, there is provided a software program product embodied in an electronic device for use in conjunction with a memory device, wherein the electronic device comprises a host module;

a bus system operatively connecting the host module and the memory device, the bus system comprising a plurality of signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system, and wherein the memory device is adapted to generate at least one further signal to cause an exchange of data, based on the further signal, between the host module and the memory device, said software program comprising:

a first code for receiving the further signal; and a second code, responsive to the further signal, for causing the host module to facilitate said exchange of data using at least some of the unused data lines even when the host module is operated in said at least one data mode.

According to the present invention, the electronic device is operable in a serial peripheral interface (SPI) mode, and the bus system further comprises a further signal line for conveying a chip select (CS) signal from the host module to the memory device, and wherein the first code recognizes the further signal when the further signal is conveyed from the memory device to the host module on the further signal line.

The present invention will become apparent upon reading the description taken in conjunction with FIGS. 4 to 7b.

DETAILED DESCRIPTION OF THE INVENTION

At power-up, the MMC bus is in the 1-bit data mode to insure backward compatibility. Afterward the host determines whether the MMC card follows the MMC Specification 4.0 or higher, the host reads the EXT_CSD (extended card-specific data) register to determine the high-speed capabilities of the card. When the MMC card is operated in the 4-bit data mode, at least four of the data channels DAT0–DAT7 are not used.

Smart Mode 1

Figure 4:
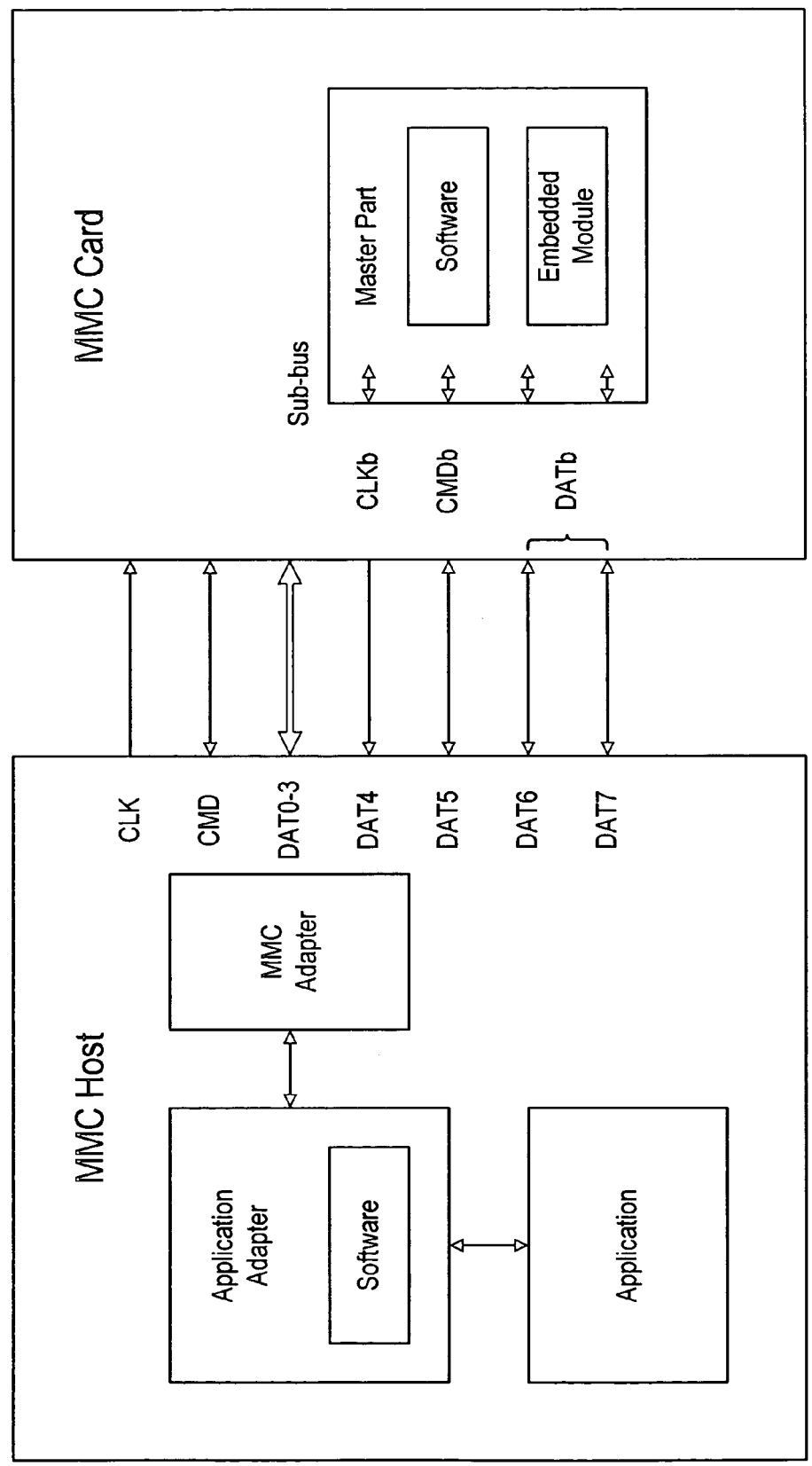
FIG. 4 is a block diagram illustrating an embodiment of the MultiMediaCard system, according to the present invention.

Assuming that the unused data channels at least comprise four data channels DAT4, DAT5, DAT6 and DAT7, one of these unused channels can be used for a clock signal CLKb from the card. The other one of these unused channels can be used for a specific line CMDb for commands issued by the MMC card toward the host, as shown in FIG. 4. This special command line gives master-like capabilities to the MMC card. As a result, the interrupt mechanism is greatly improved and the interrupt latency is drastically reduced. It is possible that the commands sent on the CMDb line may have the same format as the CMD command as defined in the MMC Specification 4.0 or other future versions. As such, no radically different hardware or different data packing format is needed.

Furthermore, one or two data lines DATb can be used by the card. In particular, only the card can send data or request that data be sent on these data lines. The signals CMDb and DATb are based on the CLKb clock, and not the clock CLK coming from the host. This is because the host could shutdown the clock CLK to reduce power consumption. But the host has to keep the card powered up when the card is in interrupt mode.

According to the present invention, the master part of the MMC card (i.e., CLKb, CMDb and DATb) is very limited and is much simpler than an MMC host. The MMC card can be designed to issue very few commands: an interrupt command and a data write command, for example. A data read command is also possible if DMA-like accesses are included. As can be seen in FIG. 4, the implementation of the MMC slave part of the MMC host is almost completely independent of the master part of the MMC host (i.e., CLK, CMD, DAT0–3). The only link between the MMC slave part and the MMC master part of the host comes from the MMC host control over the mode of operation of the bus. As such, the additional mode, according to the present invention, does not interfere with the normal 4-bit mode as defined in the MMC Specification 4.0, Draft 3, for example. With the MMC slave of the host, the additional mode can provide more features. As such, the MMC card is not simply a memory card, but a Smart MMC card.

Smart Mode 2

Figure 1:
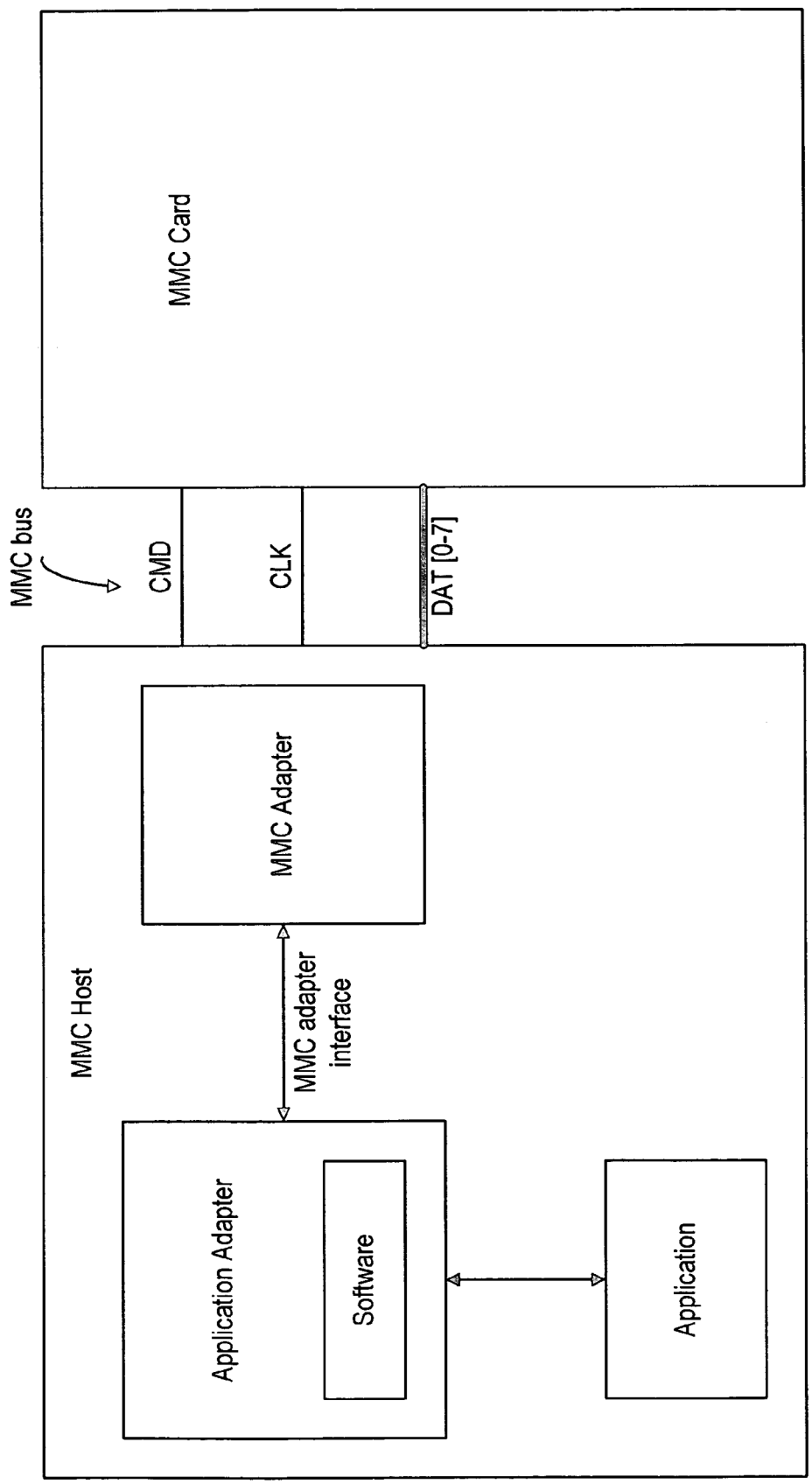
FIG. 1 is a block diagram illustrating a typical MultiMediaCard system.
Figure 2:
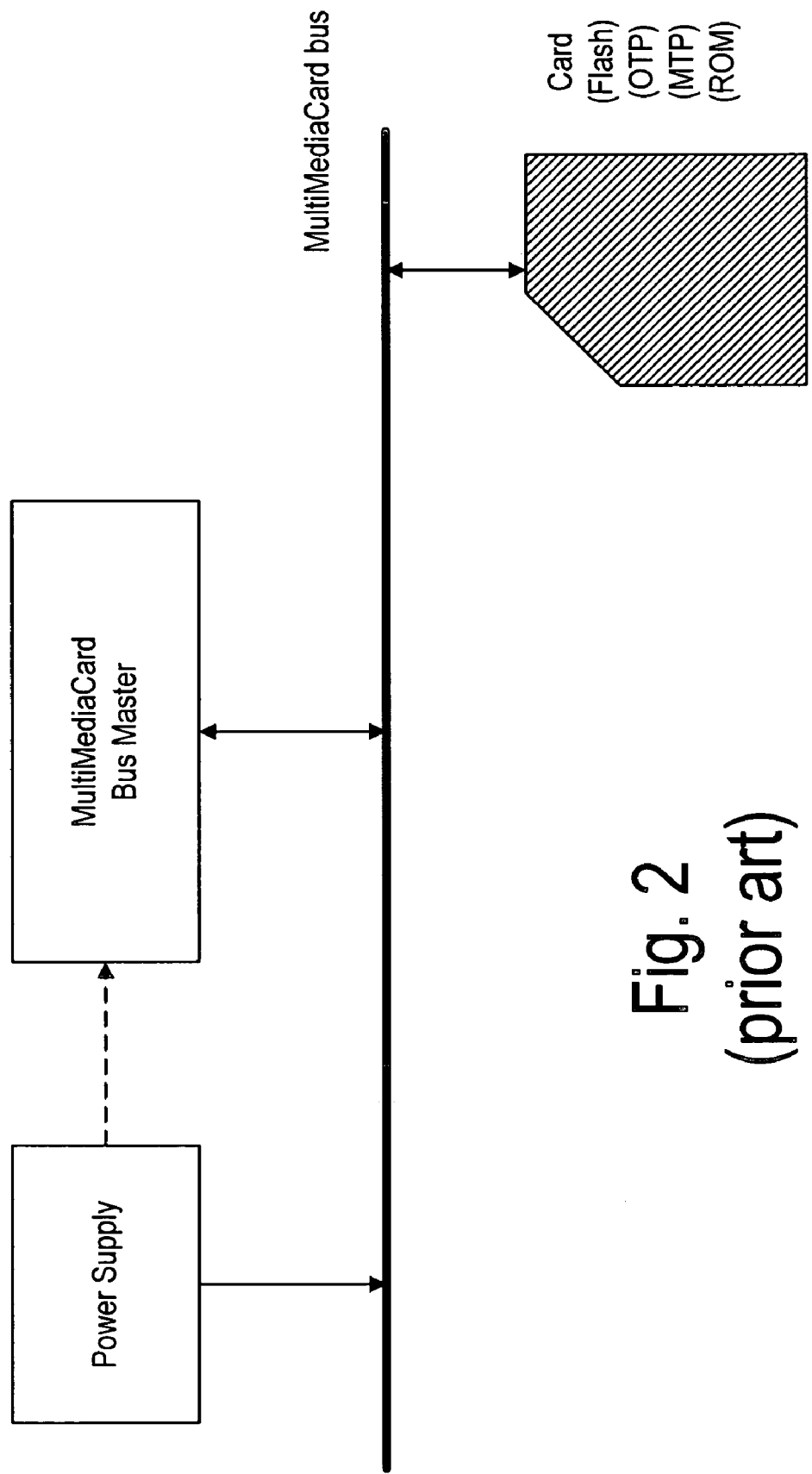
FIG. 2 is a block diagram illustrating a typical MultiMediaCard bus system.
Figure 3:
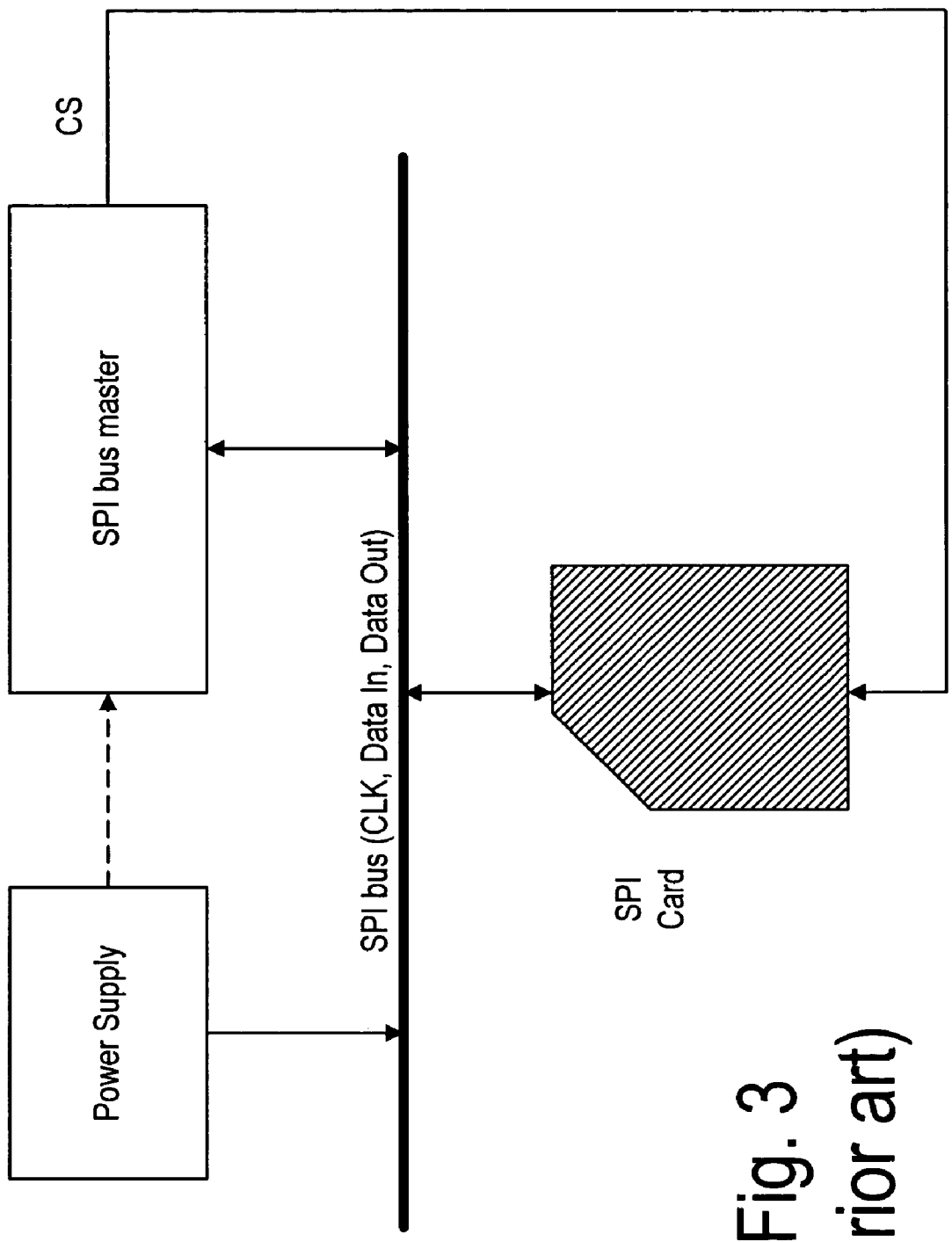
FIG. 3 is a block diagram illustrating a typical MultiMediaCard bus system that can be used in an SPI mode.
Figure 5:
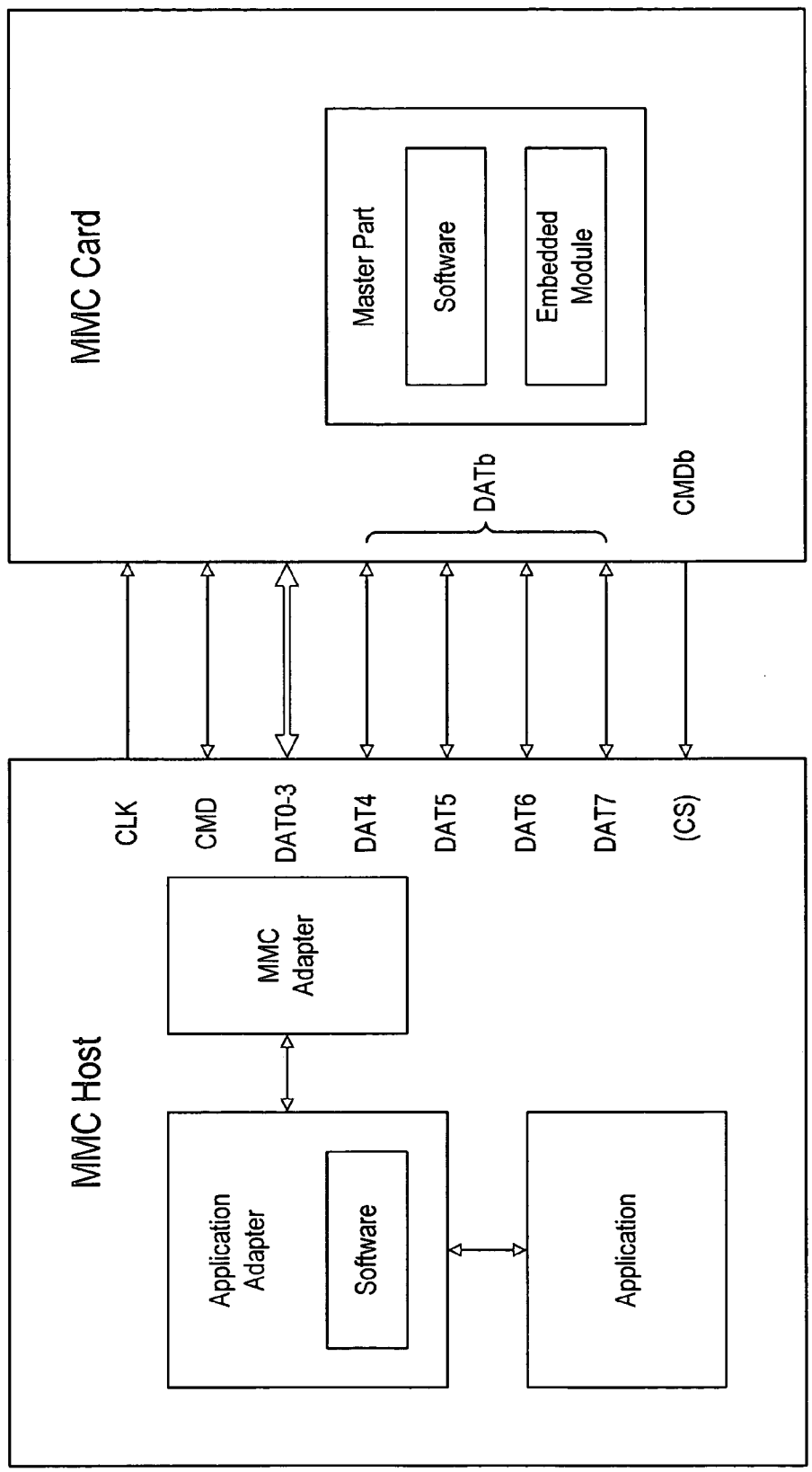
FIG. 5 is a block diagram illustrating another embodiment of the MultiMediaCard system, according to the present invention.

As shown in FIG. 3, when an MMC card is used in a device that offers the SPI mode, a CS line is available for sending signals from the SPI bus master to the card. When the MMC card in the device is operated in the 4-bit data mode, the CS signal is also present in the MMC mode but not used. As shown in FIG. 5, the unused CS line can be used as a command line CMDb for sending a number of commands, such as interrupt command, data write command and data read command. As such, the MMC card has a master function and uses the CMDb line to send MMC commands to the slave part of the MMC host. The unused data lines, DAT4–7, in the 4-bit data mode can be used as data lines from the master part of the MMC card to the corresponding slave part of the MMC host.

It should be noted that there is no CLKb shown in the Smart Mode 2 configuration, as shown in FIG. 4. This means that there is no dedicated clock signal from the MMC card. But this issue can be solved by making some changes to the MMC host as follows:

The default value of the CS lines (now CMDb) is high, compatible with the SPI mode or the MMC mode of the card.

When used in Smart Mode 2, the host activates the clock line (CLK) if it sees a high to low transition on the CS (CMDb) line in order to allow the transfer of the command from the MMC card to the MMC host. This high-to-low transition occurs when the MMC card operates in the Smart Mode 2 attempts to send an MMC command on the line, by driving the CS (CMDb) low which defines the start bit of the command.

Whenever the MMC host sends a command to the MMC card, it keeps the clock running a few more cycles after the command or after receiving a response to the command. The MMC host can turn off the clock afterward.

Although changes are needed in the MMC host in order to implement Smart Mode 2, Smart Mode 2 offers the highest bandwidth possible of the MMC card toward the MMC host. As such, the MMC bus becomes a two-master bus with an equal amount of bandwidth for both masters.

Figure 7B:
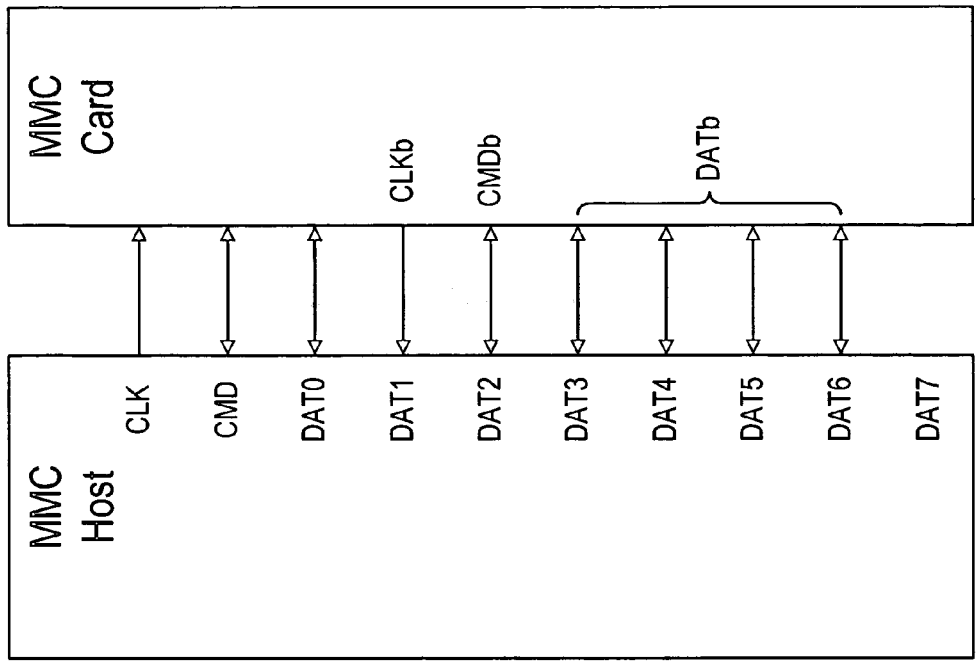
FIG. 7b is a block diagram illustrating yet another embodiment of the system.
Figure 7A:
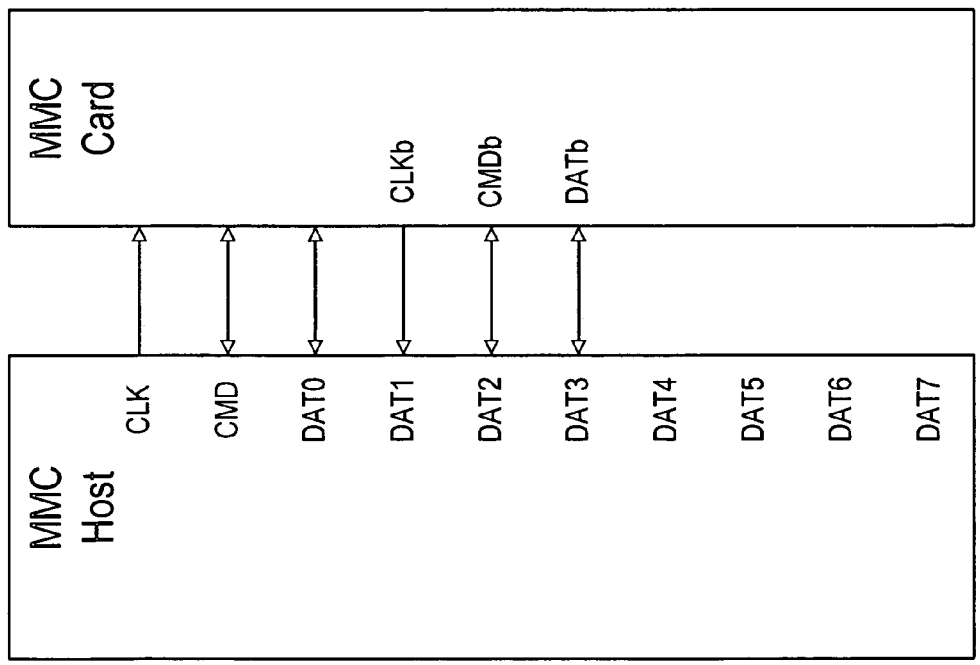
FIG. 7a is a block diagram illustrating a further embodiment of the MultiMediaCard System, according to the present invention.

It should be noted that Smart Mode 1 and Smart Mode 2, as described in conjunction with FIGS. 4 and 5, are based on the 4-bit data mode in accordance with MMC Specification 4.0, Draft 3 or the like. These Smart Modes take advantage of four unused data lines DAT4–7 and an additional CS line in the SPI mode. The same principle can be extended to any data mode that leaves one or more data lines unused. For example, in the 1-bit data mode according to the MMC Specification 4.0, Draft 3, seven data lines are left unused. These seven unused data lines, in principle, can be used for the implementation of signal and data lines in the master part of the MMC card. For example, when only DAT0 is used in the 1-bit data mode, any three of the seven unused data lines can be used for CLKb, CMDb and DATb, as shown in FIG. 7a. Alternatively, more than one unused data lines are used for conveying DATb, as shown in FIG. 7b.

Figure 6B:
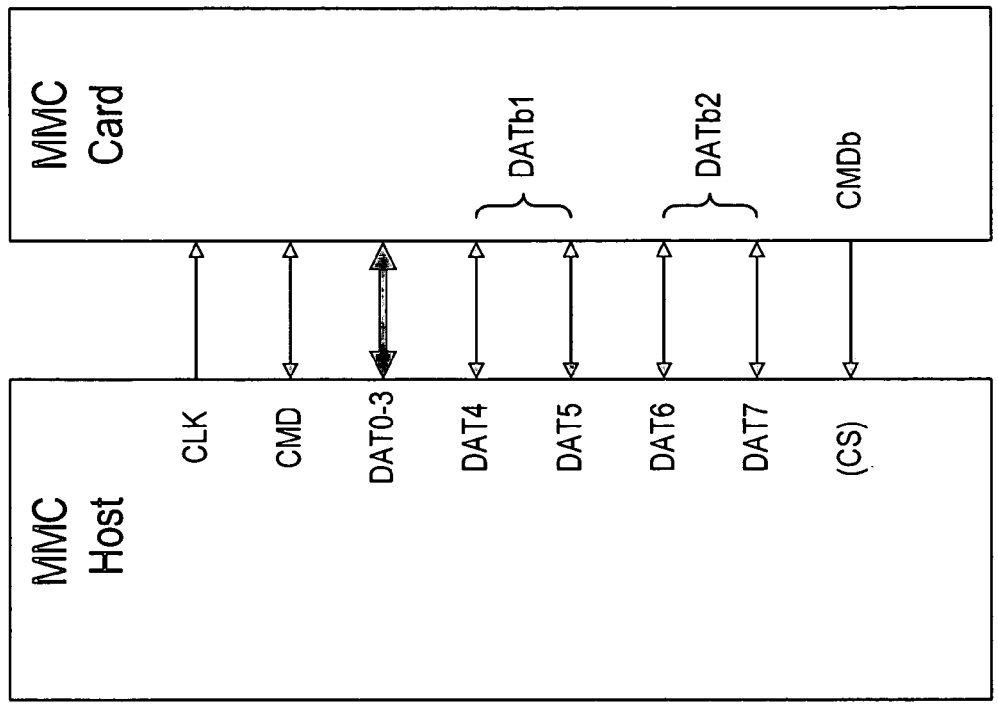
FIG. 6b is a block diagram illustrating yet another alternative embodiment of the MultiMediaCard system, according to the present invention, wherein four data lines are used for conveying two differential pairs of signals.
Figure 6A:
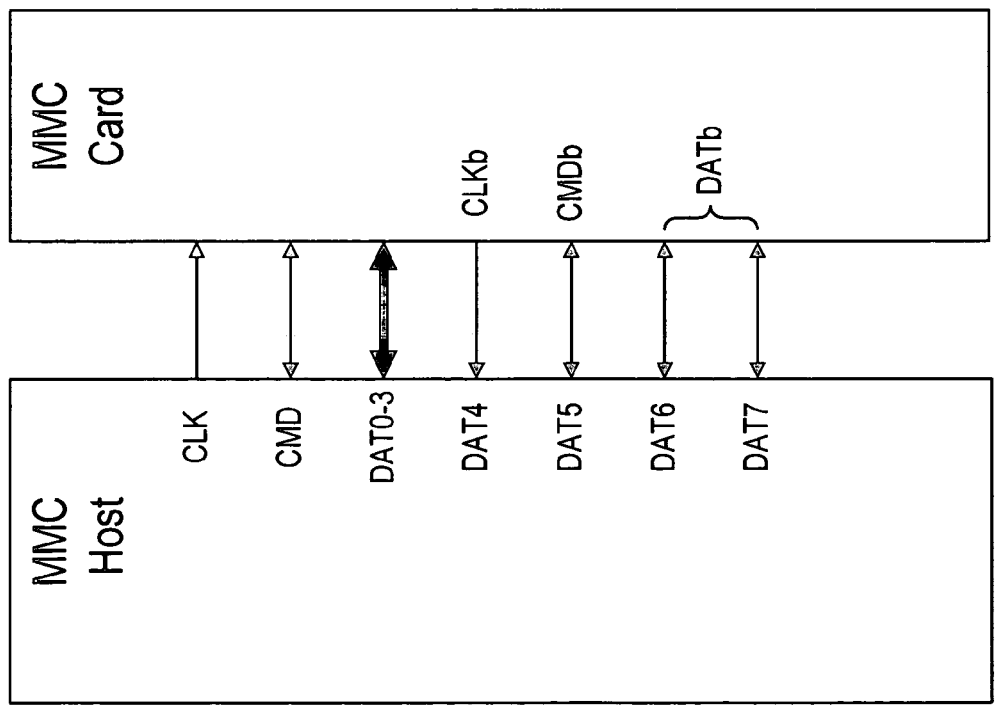
FIG. 6a is a block diagram illustrating an alternative embodiment of the MultiMediaCard system, according to the present invention, wherein at least two data lines are used for conveying differential signals.

Furthermore, when the 4-bit mode is used in an MMC system with 8 data lines, the four unused data lines can also be used as two differential pairs (DATb1, DATb2) to further increase the bandwidth, as shown in FIG. 6b. Likewise, two unused data lines can be used as one different pair, as shown in FIG. 6a. It is also possible that eight or more data lines are unused even when a MultiMediaCard system is used in an 8-bit mode, depending on the number of the total data lines available on an MMC card or a group of MMC cards used together on a device. For example, if there are N data lines available on an MMC card, which can also be used in an SPI mode, an 8-bit mode actually leaves (N+1−8) data and signal lines unused.

It should be noted that, the MMC host as shown in FIGS. 4 and 5 could have an MMC adapter, an MMC adapter interface connected to an application adapter. The MMC host could also have a software program for carrying out the tasks specified in a certain application. Thus, the MMC host, according to the present invention, is similar to the conventional MMC host in many respects. However, the MMC host, according to the present invention, is adapted to receive data (DATb) and signals (CLKb, CMDb) from the master part of the MMC card. It is possible to implement a code in the software program in the MMC host for receiving and recognizing the signals conveyed from the master part of the MMC card, and another code, responsive to the received signals, for causing the MMC host to facilitate the exchange of data (DATb) between the MMC host and the MMC card using the unused data lines. Furthermore, the MMC card, according to the present invention, has a master part in which a software program and an embedded electronic module are used to generate the clock signal (CLKb), the command (CMDd) and the data (DATb). The embedded electronic module can be a micro-controller or a complex I/O device. The memory device also has a sub-bus system for connecting the embedded electronic module and the unused data lines. The MMC host, as depicted in FIGS. 4 and 5, can be a mobile phone, a camera, a PDA, a digital recorder, an electronic toy, an electronic organizer, an MP3 player, a pager and the like.

Thus, although the invention has been described with respect to a number of embodiments thereof, it will be understood by those skilled in the art that the foregoing and various other changes, omissions and deviations in the form and detail thereof may be made without departing from the scope of this invention.

What is claimed is:

1. A method comprising:
providing in a memory device a module for generating at least one further signal, the memory device operatively connected to a host module via a bus system comprising one or more signal lines and N data lines for conveying signals and data between the host module and the memory device, wherein the host module is operable in a plurality of data modes, said plurality of data modes including at least one data mode that is designated to use M data lines to convey data between the host module and the memory device with M smaller than N, leaving (N−M) unused data lines in the bus system; and
causing an exchange of data, based on said at least one further signal, between the host module and the memory device using at least one of the unused data lines even when the host module is operated in said at least one data mode.

2. The method of claim 1, wherein said at least one further signal comprises a command signal, conveyed to the host module on another one of the unused data lines.

3. The method of claim 1, wherein N is equal to 8 and M is equal to 4, leaving 4 unused data lines, and wherein said at least one further signal comprises a clock signal conveyed from the memory device to the host module on another one of the unused data lines, and a command signal conveyed between the host module and the memory device on yet another one of the unused data lines.

4. The method of claim 1, wherein the host module is disposed in an electronic device and the electronic device is operable in a serial peripheral interface mode and the bus system further comprises a further signal line for conveying a chip select signal from the host module to the memory device, and wherein the signal is conveyed from the memory device to the host module on the further signal line.

5. The method of claim 1, wherein N is equal to 8 and M is equal to 1, leaving 7 unused data lines, and wherein said at least one further signal comprises a clock signal conveyed from the memory device to the host module on another one of the unused data lines, and a command signal conveyed between the host module and the memory device on yet another one of the unused data lines.

6. The method of claim 2, wherein said at least one further signal further comprises a clock signal conveyed to the host module on yet another one of the unused data lines.

7. The method of claim 3, wherein said at least one of the unused data lines comprises two unused data lines for carrying out the exchange of data in a differential manner.

8. The method of claim 4, wherein the further signal comprises a command signal.

9. The method of claim 4, wherein N is equal to 8 and M is equal to 4, leaving 4 unused data lines for carrying out the exchange of data.

10. The method of claim 5, wherein said exchange of data is carried out on a different one of the unused data lines.

11. The method of claim 9, wherein exchange of data is carried out in two differential pairs.

12. The method of claim 10, wherein said exchange of data is carried out on two or more different unused data lines.

13. An electronic device, comprising:
a host module; and
a bus system operatively connecting the host module to a memory device, the bus system comprising one or more signal lines and N data lines for conveying signals and data between the host module and the memory device, wherein the host module is operable in a plurality of data modes, said plurality of data modes including at least one data mode designated to use M data lines to convey data between the host module and the memory device, with M smaller than N, leaving (N−M) unused data lines in the bus system, and wherein the memory device is capable of generating at least one further signal, for causing an exchange of data, based on the further signal, between the host module and the memory device using at least one of the unused data lines even when the host module is operated in said at least one data mode.

14. The electronic device of claim 13, wherein the memory device comprises an embedded module for generating said at least one further signal.

15. The electronic device of claim 13, comprising a mobile phone.

16. The electronic device of claim 13, comprising a software program, responsive to said at least one further signal, for processing the data exchanged between the host module and the memory device on at least one of the unused data lines.

17. The electronic device of claim 14, wherein said at least one further signal comprises a command signal conveyed to the host module on another one of the unused data lines.

18. The electronic device of claim 13, comprising a personal data assistant device.

19. The electronic device of claim 13, operable in a serial peripheral interface, wherein the bus system further comprises a further signal line for conveying a chip select signal from the host module to the memory device, and wherein the further signal is conveyed from the memory device to the host module on the further signal line.

20. The electronic device of claim 17, wherein said at least one further signal further comprises a clock signal conveyed to the host module on yet another one of the unused data lines.

21. The electronic device of claim 19, wherein the further signal comprises a command signal.

22. A memory device comprising:
a module for generating at least one further signal configured to be conveyed to a host module via a bus system, the bus system comprising one or more signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system; and
a sub-bus system operatively connecting the module and at least some of the unused data lines for causing an exchange of data, based on the further signal, using said at least some of the unused data lines even when the host module is operated in said at least one data mode.

23. The memory device of claim 22, wherein said at least one further signal comprises a clock signal conveyed to the host module one another one of the unused data lines.

24. The memory device of claim 22, wherein the module for generating said at least one further signal comprises a micro-controller.

25. The memory device of claim 22, wherein the module for generating said at least one further signal comprises an input/output device.

26. The memory device of claim 23, wherein said at least one further signal comprises a command signal conveyed to the host module on yet another one of the unused data line.

27. A software program product embodied in a memory device, the memory device for use in conjunction with a host module via a bus system, the bus system comprising a plurality of signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system, said software program comprising:
a code for generating at least one further signal; and
a code for causing an exchange of data, based on the further signal, between the host module and the memory device using said at least some of the unused data lines even when the host module is operated in said at least one data mode.

28. The software program product of claim 27, wherein said at least one further signal comprises a command signal.

29. The software program product of claim 27, wherein said at least one further signal comprises a clock signal.

30. A software program product embodied in an electronic device for use in conjunction with a memory device, wherein the electronic device comprises
a host module;
a bus system operatively connecting the host module and the memory device, the bus system comprising a plurality of signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system, and wherein the memory device is adapted to generate at least one further signal to cause an exchange of data, based on the further signal, between the host module and the memory device, said software program comprising:
a first code for receiving the further signal; and
a second code, responsive to the further signal, for causing the host module to facilitate said exchange of data using at least some of the unused data lines even when the host module is operated in said at least one data mode.

31. The software program of claim 30, wherein the electronic device is operable in a serial peripheral interface mode, and the bus system further comprises a further signal line for conveying a chip select signal from the host module to the memory device, and wherein the first code recognizes the further signal when the further signal is conveyed from the memory device to the host module on the further signal line.

32. An electronic module comprising:
a processor configured to communicate with a memory device via a bus system, the bus system comprising one or more signal lines and N data lines for conveying signals and data between the host module and the memory device, wherein the host module is operable in a plurality of data modes, said plurality of data modes including at least one data mode designated to use M data lines to convey data between the host module and the memory device, with M smaller than N, leaving (N−M) unused data lines in the bus system, and wherein the memory device is capable of generating at least one further signal, for causing an exchange of data, based on the further signal, between the host module and the memory device using at least one of the unused data lines even when the host module is operated in said at least one data mode.

33. The electronic module of claim 32, wherein said at least one further signal comprises a command signal, conveyed to the host module on another one of the unused data lines.

34. A memory module, comprising:
means, operatively connecting the module and at least some of the unused data lines, for causing an exchange of data with a host module via a bus system, the bus system comprising one or more signal lines and N data lines for conveying signals and data between the host module and the memory device, wherein the host module is operable in a plurality of data modes, said plurality of data modes including at least one data mode that uses M data lines to convey data between the host module and the memory device, with M smaller than N, leaving (N−M) unused data lines in the bus system; and
means for generating at least one further signal, so that said exchange of data is based on the further signal, using said at least some of the unused data lines even when the host module is operated in said at least one data mode.

35. The memory module of claim 34, wherein said generating means comprises an input/output means.

* * * * *